June 28, 1960 E. T. PLATZ ET AL 2,943,244
PANELBOARD
Filed Feb. 3, 1954 2 Sheets-Sheet 1
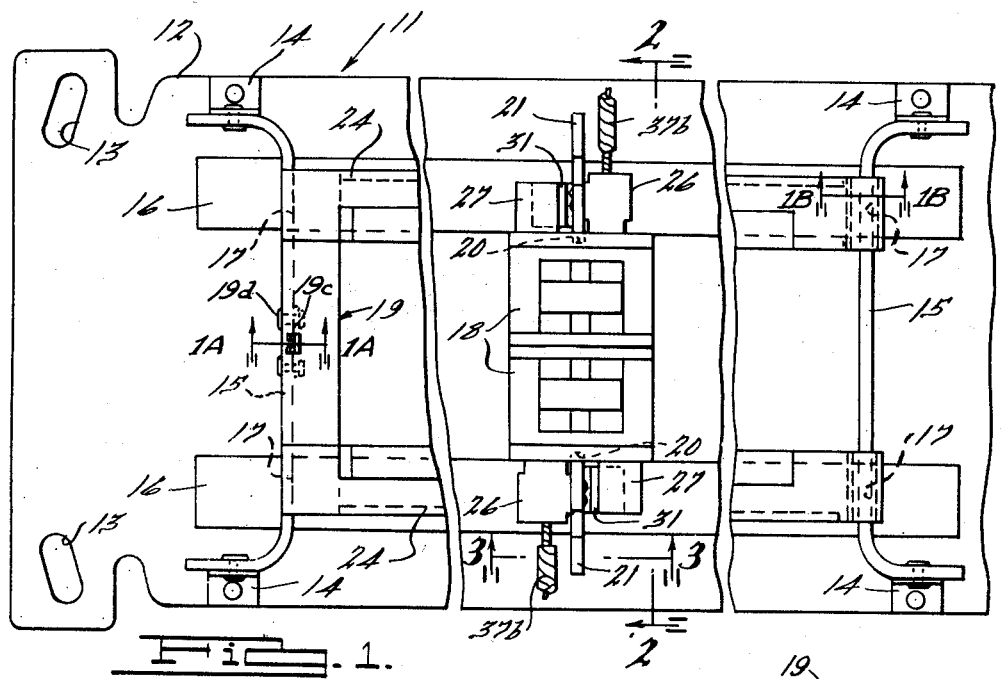
INVENTORS.
Elwood T. Platz
William H. Frank
BY
A. Eugene Bychinsky
ATTORNEY.

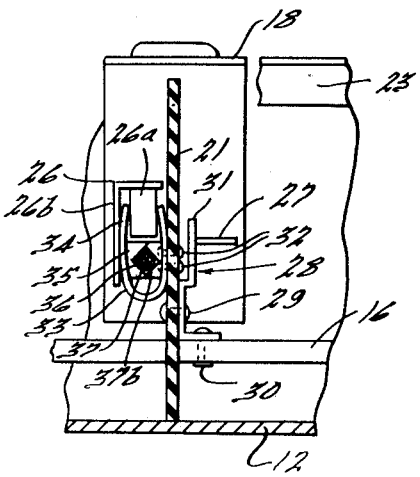
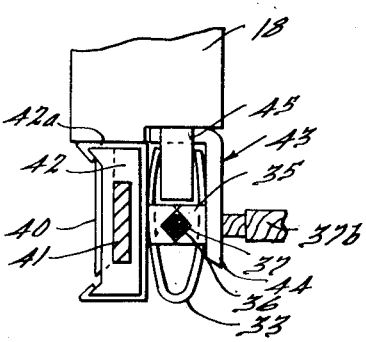
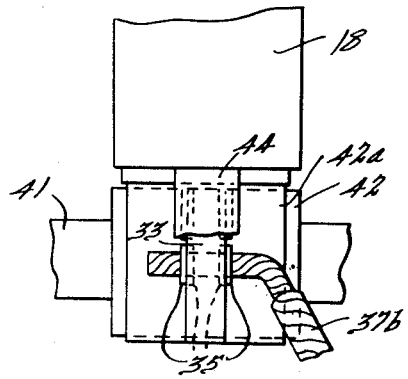
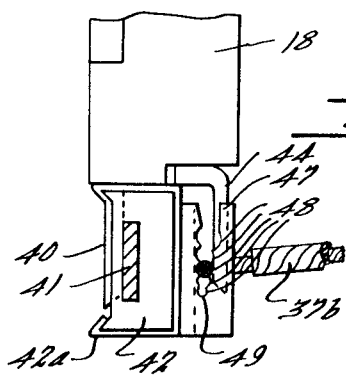

United States Patent Office 2,943,244
Patented June 28, 1960

2,943,244
PANELBOARD

Elwood T. Platz and William H. Frank, Detroit, Mich., assignors, by mesne assignments, to I-T-E Circuit Breaker Company, Philadelphia, Pa., a corporation of Pennsylvania Filed Feb. 3, 1954, Ser. No. 408,002

10 Claims. (Cl. 317—119)

This invention relates generally to panelboards and switch units for use therewith used for the control and distribution of electrical power and specifically to the type of panelboard used for the control and distribution of low voltage electric power in commercial, industrial, or residential buildings.

A primary object of this invention is to provide a panelboard switch unit combination which permits an efficient, simple connection between the switch unit, the panelboard electric supply and the electrical load.

Another object is to provide a panelboard in which the installation of switch units is controlled by the electrical load wire size.

Another object is to provide a panelboard which precludes the installation of switch units of greater rating than that of the branch circuit conductors.

Another object is to provide a switch unit for use in a panelboard which can be easily and positively inserted between the line and the load in an electrical distribution system.

Another object is to provide a panelboard connector which permits an efficient, quick electrical connection between a switch unit and a branch circuit conductor.

Still another object is to provide a panelboard having a novel electrical barrier for supporting and isolating the electrical parts.

Still another object is to provide a panelboard having an electrical barrier which positions and secures the switch units.

Other objects and advantages will become apparent from the following description and drawings in which:

Fig. 1 is a plan view of a portion of a panelboard interior showing two switch units inserted.

Fig. 1A is a partial cross-sectional view on line 1A—1A of Fig. 1. Fig. 1B is a partial cross-sectional view on line 1B—1B of Fig. 1.

Fig. 2 is an elevational section view on line 2—2 of Fig. 1.

Fig. 3 is a side elevational view of the connection between a switch unit and a panelboard.

Fig. 4 is a detailed side elevational view of another embodiment of a connection between the switch unit and the panelboard.

Fig. 5 is a detailed side elevational view of the structure shown in Fig. 4 with a portion removed.

Fig. 6 is a side elevational view of another embodiment of a connection between the switch unit and the panelboard.

Referring to the drawings, Fig. 1 shows a portion of a panelboard interior indicated generally as 11. Such a structure is normally mounted in a sheet metal enclosure and receives and secures a number of switch or circuit breaker units for the distribution and control of low voltage electrical power. This interior includes a metal base plate 12 having elongated mounting holes 13 which receive bolts (not shown) for securing the interior to the back of an appropriate sheet metal enclosure. Disposed at each end of base plate 12 and secured to it by angle clips 14 is a barrier support 15 of insulative material. These barrier supports 15 serve to enclose the power distributive section of the interior 12. Disposed in slots 17 of barrier supports 15 are laterally spaced bus bar conductors 16. These bus bar conductors 16 are known in the art as the "line" and are electrically energized by connecting to them appropriate conductors (not shown) from an electrical power source. Secured to the panelboard interior structure and electrically connected between the "line" and the load or branch circuits to thereby control the latter are switch units 18, two of which are shown in place. These units may be one of many types of combination switch overload circuit cutouts. The particular unit shown is a combination switch and circuit breaker similar to that disclosed in Patent 2,385,727, issued to E. T. Platz, and which is assigned to the assignee of the present application. These units 18 control and protect branch circuits served by the panelboard. They have a predetermined amperage rating and function to interrupt the particular branch electrical circuit to which they are connected upon the occurrence of an overload current of certain magnitude in the branch circuit. The magnitude of overload current at which the switch units interrupt the circuit is normally controlled by the current capacity of the energized branch circuit device and the branch circuit load conductors connected thereto. As shown in Figs. 1 and 2, the switch units are positioned back-to-back in an appropriate manner. A U-shaped metal retainer 19 is hinged at its lower end as shown in Fig. 1B to barrier support 15. In the closed position of Figs. 1 and 2, it overlies a portion of switch units 18 as shown in Fig. 2 to thereby secure them in the panelboard interior. The longitudinal members 24 of retainers 19 have turned-down portions 23 positioned in slots 25 of barriers 21, as hereinafter described. This retainer 19 is suitably latched at its upper end as shown in Fig. 1A to the other barrier support 15. To remove or add switch units 18, it is therefore necessary to unlatch retainer 19 and rotate it outwardly to remove it from engagement with the upper surfaces of switch units 18.

Each switch unit 18 is formed with a vertical slot 20 in its front surface which extends upwardly from the bottom to within approximately 1/8" of the unit's upper surface, as shown in Fig. 2. Disposed within slots 20 and extending vertically from base plate 12 are rectangular shaped barriers 21, made of suitable insulating material. Openings 22 of barriers 21 enclose and support bus bar conductors 16. These barriers 21 serve to guide switch units 18 upon insertion and position and support them after installation by means of their engagement with slots 20 of the switch units 18. Additionally, barriers 21 separate the line and branch circuit connections of the switch units 18 as shown in Fig. 3. A line connector 28 is secured to the right side of each barrier 21 (Fig. 3) by a rivet 29 and to bus bar conductor 16 by a rivet 30. The upper portion of line connector 28 is offset as shown in Fig. 3 to enable the switch unit line connector 27 to engage the resilient contact portion 31 of line connector 28 as the switch unit is inserted into the panelboard interior. Secured to the left side of barrier 21 by rivets 32 is a panelboard load connector 33. This load connector 33 is formed of a spring-type conductive metal, such as bronze, and includes a body portion 34 bent in a U shape having two inwardly turned opposed lugs 35 extending from each side of the U. The lugs 35 are offset from each other to permit overlapping engagement and are notched at 36 to provide an aperture 37 for the insertion of a branch circuit conductor 37b. The space between the open part of the U is determined by the degree of overlap of lugs 35, which in turn is determined by the size of a branch circuit conductor 37b which is inserted into aperture 37.

Secured to the front of each switch unit 18 is a switch unit line connector 27 and a load connector 26. The switch unit load connector 26 includes a portion forming a gage 26a, the width of which is varied according to the rating of the breaker. For example, a breaker having a 50 ampere rating will have a wider gage 26a than a breaker of 15 ampere rating. Another portion of switch unit load connector 26 forms a contact 26b. When a switch unit 18 of a certain predetermined rating is inserted into the panelboard, as in Fig. 3, the gage portion 26a of switch unit connector 26 will slide easily into the bight of the U-shaped panelboard load connector 33 having a branch circuit conductor 37b of equivalent rating inserted therein. Further opening of connector 33 by gage 26a of switch unit load connector 26 is inhibited by contact 26b. The circuit is thus established from bus bar 16 to line connector 28 to switch unit line connector 27 through switch unit 18 to switch unit load connector 26 to panelboard load connector 33 to the load conductor 37b.

If a switch unit 18 of greater rating than that desired to be imposed upon a particular branch circuit conductor or load is inserted into the panelboard, gage 26a would not slide into the bight of the U-shaped panelboard load connector 33. Installation of a switch unit or circuit breaker having a higher rating which would not protect the branch circuit is thus precluded.

Another embodiment of the panelboard load connection is shown in Figs. 4 and 5. In this embodiment the switch unit line connector 40 is a vertically-extending prong which contacts a bus bar 41 enclosed in a suitable insulative support 42. The switch unit load connector extends from the bottom of switch unit 18 and includes a contact 44 and a gage 45. Secured to insulative support 42 is a connector clamp 42a having welded thereto the load connector 33 illustrated in the preferred embodiment. Rating conformance of switch unit to load conductor is achieved in the same manner as with the structure described in the preferred embodiment.

Another form of a load connector is shown in Fig. 6. This form is comprised of a rectangular block of metal with a slot 47 having a series of opposed notches 48 formed therein which diminish in size from top to bottom, as shown in Fig. 6. Such notches 48 receive load conductors of standard size, e.g., the lower pair of notches is of appropriate size to receive a number 14 wire of .064 inch in diameter. Rating conformance in this embodiment is obtained by varying the length of switch unit load connector 44. In switch units 18 of progressively relative higher rating, the load connector 44 is made progressively shorter. Contact can thus be made only with a load conductor 37b of greater size inserted into the appropriate notch corresponding to the larger diameter of the conductor. A relative vertical position is thus determined which will result in conductive engagement between the load conductor 37b and an appropriate switch unit load connector 44.

From the foregoing disclosure it can be seen that a novel panelboard switch unit connection is provided in which effective correlation of branch circuit overload protection and load conductor capacity is obtained. Furthermore, a panelboard is obtained which provides a convenient, easily assembled, electrically safe combination of the panelboard mounting, the switch units, and the electrical supply and load conductors.

Having described the invention, reference is had to the claims by which we claim:

1. In a panelboard containing a connection, including a first elongated bus bar, to a source of electric power, a plurality of switch units for controlling and protecting branch electrical load circuits connected thereto, each of said units having a line connector for connecting said unit to said source of power, and a load connector for connecting said unit to a branch circuit conductor, a single insulating member having a panelboard line and branch circuit connector affixed thereto, said connectors arranged to be engaged by the corresponding switch unit line and branch circuit load connectors for transmitting electric current from said source of power through said switch unit to a branch circuit conductor inserted into said panelboard branch circuit load connector, said single insulating member engaging each of said switch units to thereby support and position it in said panelboard, said insulating member comprising a thin sheet-like element positioned in a plane transverse to the longitudinal axis of said bus bar.

2. In a panelboard containing a connection to a source of electric power, a plurality of switch units for controlling and protecting branch electrical load circuits connected thereto, each of said units having a line connector for connecting said unit to said source of power, and a load connector for connecting said unit to a branch circuit conductor, a single insulating member having a panelboard line and branch circuit load connector affixed thereto, said connectors arranged to be engaged by the corresponding switch unit line and branch circuit load connectors for transmitting electric current from said source of power through said switch unit to a branch circuit conductor inserted into said panelboard branch circuit load connector, said switch unit load connector comprising a gage element and a contact element, said panelboard branch circuit load connector including an opening whose size is established by said branch circuit conductor after insertion thereof into said panelboard branch circuit load connector, said gage element being entered into said opening.

3. In a panelboard containing a connection to a source of electric power, a plurality of switch units for controlling and protecting branch electrical load circuits connected thereto, each of said units having a line connector for connecting said unit to said source of power, and a load connector for connecting said unit to a branch circuit conductor, a single insulating member having a panelboard line and branch circuit load connector affixed thereto, said insulating member comprising a thin sheet-like element, said connectors being positioned on opposite sides of said element, said connectors arranged to be engaged by the corresponding switch unit line and branch circuit load connectors for transmitting electric current from said source of power through said switch unit to a branch circuit conductor inserted into said panelboard branch circuit load connector, said branch circuit load connector having a portion adapted to receive said switch unit load connector; and said line circuit connector adapted to receive said switch unit line connector.

4. In a panelboard containing a connection to a source of electric power, a plurality of switch units for controlling and protecting branch electrical load circuits connected thereto, each of said units having a line connector for connecting said unit to said source of power, and a load connector for connecting said unit to a branch circuit conductor, a single insulating member having a panelboard line and branch circuit load connector affixed thereto, said connectors arranged to be engaged by the corresponding switch unit line and branch circuit load connectors for transmitting electric current from said source of power through said switch unit to a branch circuit conductor inserted into said panelboard branch circuit load connector, said switch unit load connector and said branch circuit load connector including cooperating elements acting in conjunction with said branch circuit conductor comprising means for preventing the installation of a switch unit of greater amperage rating than that of the branch circuit load conductor secured to said branch circuit load connector.

5. In a panelboard containing a connection to a source of electric power, a plurality of switch units for controlling and protecting branch electrical load circuits connected thereto, each of said units having a line connector for connecting said unit to said source of power, and a load connector for connecting said unit to a branch circuit conductor, a single insulating member having a panelboard line and branch circuit load connector affixed thereto, said connectors arranged to be engaged by the corresponding switch unit line and branch circuit load connectors for transmitting electric current from said source of power through said switch unit to a branch circuit conductor inserted into said panelboard branch circuit load connector, said switch unit load connector comprising a gage element and a contact element, said panelboard branch circuit load connector including an opening whose size is established by said branch circuit conductor after insertion thereof into said panelboard branch circuit load connector, said gage element being entered into said opening, said switch unit load connector and said branch circuit load connector comprising means for preventing the installation of a switch unit of greater amperage rating than that of the branch circuit load conductor secured to said branch circuit load connector.

6. An electrical coupling for use in a panelboard for joining a panelboard switch unit to a branch circuit load conductor comprising a unitary connector on said switch unit having a gage element and a contact element; a unitary load connector secured to said panelboard having a first portion for receiving said switch unit load connector gage element and a second portion for receiving a branch circuit load conductor of equal or greater amperage rating than that of said switch, said contact element being engageable with said connector secured to said panelboard only when said first portion is of a size sufficient to receive said gage element.

7. A load connector for use in a panelboard for electrically joining a branch circuit conductor to a switch unit load connector comprising a resilient U-shaped member having notched inwardly turned opposed lugs, said notched lugs forming a variable aperture for selectively receiving in holding engagement branch circuit conductors of variable amperage ratings.

8. A load connector for use in a panelboard for electrically joining a branch circuit conductor to a switch unit load connector comprising a slotted member having a series of notches diminishing in size from the top of said notch to the bottom thereof, said notches being arranged to receive branch circuit load conductors of varying diameter, said switch unit load connector being of predetermined length to engage selectively a branch circuit load conductor of equivalent or greater amperage rating than that of said switch unit.

9. In a panelboard, plurality of switch units a plurality of conductors for supplying electric power to said panelboard, each of said switch units having a slot in a wall thereof, an insulative plate having a portion disposed in said slot for positioning and securing said switch unit in said panelboard, said insulative plate having openings therein for receiving and supporting said conductors, said conductors being elongated, said plate being positioned in a plane substantially perpendicular to the longitudinal axes of said conductors.

10. In a panelboard, a plurality of switch units, each of said switch units having a line connector and a load connector secured thereto, each of said switch units having a slot in a wall thereof, an insulative barrier plate having a portion disposed in said slot for positioning and securing said switch unit, said barrier plate including a branch circuit load connector and a line econnector for receiving the corresponding switch unit load and line connectors secured thereto an⬛positioned on opposite sides thereof.

References Cited in the file of this patent

UNITED STATES PATENTS

| | | |
|---|---|---|
| 429,133 | Kammeyer | June 3, 1890 |
| 1,552,262 | Betz | Sept. 1, 1925 |
| 1,642,698 | Rohn | Sept. 20, 1927 |
| 1,782,019 | Wheeler | Nov. 18, 1930 |
| 2,199,626 | Freese | May 7, 1940 |
| 2,356,752 | Deysher | Aug. 29, 1944 |
| 2,428,320 | Platz | Sept. 30, 1947 |
| 2,428,322 | Robertson | Sept. 30, 1947 |
| 2,579,538 | Bierce | Dec. 25, 1951 |
| 2,601,147 | Jackson | June 17, 1952 |
| 2,632,039 | Hammerly | Mar. 17, 1953 |
| 2,647,225 | Cole | July 28, 1953 |
| 2,707,761 | Page | May 3, 1955 |
| 2,733,386 | Myers | Jan. 31, 1956 |